(No Model.)

J. ADT.
METHOD OF MAKING COTTER PINS.

No. 330,660. Patented Nov. 17, 1885.

Witnesses.
J. N. Shumway
Fred C. Earle

John Adt,
Inventor.
By Atty

UNITED STATES PATENT OFFICE.

JOHN ADT, OF NEW HAVEN, CONNECTICUT.

METHOD OF MAKING COTTER-PINS.

SPECIFICATION forming part of Letters Patent No. 330,660, dated November 17, 1885.

Application filed September 25, 1885. Serial No. 178,132. (No model.)

*To all whom it may concern:*

Be it known that I, JOHN ADT, of New Haven, in the county of New Haven and State of Connecticut, have invented a new Improvement in the Manufacture of Cotter-Pins; and I do hereby declare the following, when taken in connection with accompanying drawings and the letters of reference marked thereon, to be a full, clear, and exact description of the same, and which said drawings constitute part of this specification, and represent, in—

Figure 1:
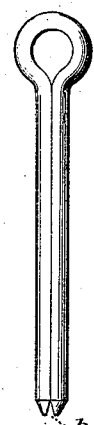
Figure 2:
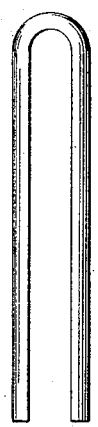
Figure 3:
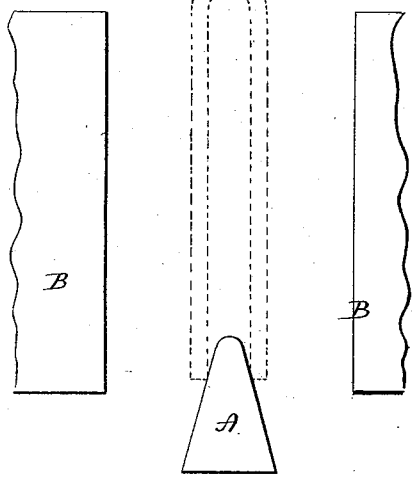
Figure 4:
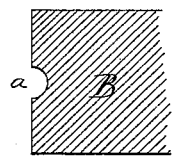
Figure 5:
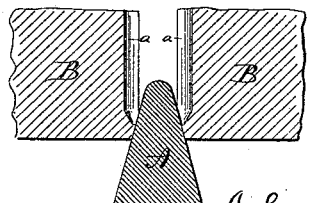

Figure 1, the finished pin with the legs closed; Fig. 2, the blank as bent into U shape preparatory to the formation of the pin; Fig. 3, a top view of the dies and anvil of an apparatus adapted to swage the ends of the leg; Fig. 4, a transverse section through one of the dies, showing the groove in its face; Fig. 5, a horizontal section through the dies and anvil, cutting through the grooves in the face of the dies.

This invention relates to an improvement in the manufacture of the article commonly called "cotter-pins"—that is to say, an article formed from a piece of wire, usually half-round, doubled to bring the flat sides together, the bend forming an eye or head at one end of the pin, the two legs elastic and so as to spread somewhat at their point, and so that when brought together and introduced through a hole—as in an axle—they will open after passing through the hole, such opening serving to secure the pin in place, and the pin to hold some loose article—as a wheel—on the axle. In many cases it is desirable to open the ends of the legs after they have passed through the hole to a considerable extent, and so as to bend the legs outward to prevent the withdrawal of the pin. Such bending is common, particularly in roller-skates and in agricultural implements. Formerly the pins were made with their flat sides together, and so that a sharp instrument must be introduced between the two legs to make such bend. As a means for readily introducing an instrument between the legs, they have been filed away slightly at the point, so as to make a V-shaped recess between the two, into which an instrument might be introduced to bend the legs.

In a patent granted to me, No. 324,206, I devised a method of manufacture in which the pin as manufactured should have the V-shaped recess between the legs at the end without the necessity of cutting away the metal, and this I did by making a short outward bend in the legs near the ends, so as to throw the two legs from each other at the ends and form the V-shaped recess, then cut away the surplus metal upon the outside which was thrown out by the bend. It is necessary to reduce the ends of the legs to conical shape to facilitate the insertion of the pin into the hole. The additional cutting of the metal necessary after the bending operation, as in my patent before referred to, is a considerable item in the expense of manufacture.

The object of my present invention is to not only avoid such surplus cutting, but also to avoid the cutting operation entirely; and it consists in swaging the legs upon a wedge-shaped anvil, so as to make an outward bevel upon the inside without bending the legs, and also in swaging the outer surface of the ends of the legs into conical shape.

In the manufacture of pins under my present improvement I first bend the wire-blank into U shape, as seen in Fig. 2, and as the best means for swaging the ends I employ an apparatus in which is a fixed anvil, A, of wedge shape, the inclination of the two sides being substantially that which it is desired to give to the inner side of the legs of the pin, and I provide a pair of transversely-movable dies, B B, which are arranged to move in a plane at right angles to a line through the wedge-shaped anvil, one each side the anvil, as seen in Fig. 3. The face of each of these dies is constructed with a longitudinal groove, *a*, (see Fig. 4,) corresponding to the outer surface of the legs of the blank. The blank is introduced to the anvil, bringing its two points upon the anvil while the dies are withdrawn, and as seen in Fig. 3; but the ends of the legs must not extend beyond the side of the dies opposite to which they are introduced. Then the dies are advanced against the respective sides of the blank, and so as to force the legs upon respective sides of the anvil, thus swaging the ends of the legs to form a bevel on the inside of the ends, which, when brought together, will produce the V-shaped recess *b*, as seen in Fig. 1. The groove in each of the dies does not extend entirely through the face of the die, but, stopping short of one side, terminates at that point in the reverse of the desired shape of the outside of the finished end of the leg, and so that as the dies are brought together upon the blank the grooves therein will not only swage the incline upon the inside of the leg, but will produce the conical-shaped termination on the outside, and as seen in Fig. 1. The conical shaping of the outside, may, however, be attained by milling, and a very considerable advantage gained in consequence of the beveling of the inside by this process of swaging.

In illustrating the apparatus by which the swaging operation may be performed I have not shown the mechanism for moving the dies, as such is common and well-known and requires no particular description, the machine itself constituting no part of the present invention. Such anvil and dies, however, may be used in many well-known machines for making articles of wire, and whereby this method of manufacture may be carried out.

I claim—

1. The herein-described improvement in the manufacture of cotter-pins, consisting in swaging the extreme ends of the legs to form a bevel upon the inside of both, the bevel of the two forming a V-shaped recess between the two legs and without bending the legs, substantially as described.

2. The herein-described improvement in the manufacture of cotter-pins, consisting in swaging the extreme ends of the legs to form a bevel upon the inside of both, the bevel of the two forming a V-shaped recess between the two legs, and at the same time swaging the outer surface of the points of the legs into conical shape, substantially as described.

JOHN ADT.

Witnesses:
JOHN E. EARLE,
FRED C. EARLE.